(12) United States Patent
Lee et al.

(10) Patent No.: US 11,164,388 B2
(45) Date of Patent: Nov. 2, 2021

(54) ELECTRONIC DEVICE AND METHOD FOR PROVIDING AUGMENTED REALITY OBJECT THEREFOR

(71) Applicant: Samsung Electronics Co., Ltd., Gyeonggi-do (KR)

(72) Inventors: Jaehan Lee, Gyeonggi-do (KR); Wooyong Lee, Gyeonggi-do (KR); Seungpyo Hong, Gyeonggi-do (KR); Hoik Hwang, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/971,365

(22) PCT Filed: Feb. 21, 2019

(86) PCT No.: PCT/KR2019/002109
§ 371 (c)(1),
(2) Date: Aug. 20, 2020

(87) PCT Pub. No.: WO2019/164287
PCT Pub. Date: Aug. 29, 2019

(65) Prior Publication Data
US 2021/0027540 A1 Jan. 28, 2021

(30) Foreign Application Priority Data
Feb. 23, 2018 (KR) .................. 10-2018-0022202

(51) Int. Cl.
*G06T 19/00* (2011.01)
*G06F 3/041* (2006.01)
(Continued)

(52) U.S. Cl.
CPC ............ *G06T 19/006* (2013.01); *G06F 3/041* (2013.01); *G06T 15/20* (2013.01); *G06T 15/205* (2013.01);
(Continued)

(58) Field of Classification Search
None
See application file for complete search history.

(56) References Cited

U.S. PATENT DOCUMENTS 7,016,824 B2 * 3/2006 Waupotitsch ........ G02C 13/003
345/419
9,286,715 B2 * 3/2016 Coon .................... G02C 13/003
(Continued)

FOREIGN PATENT DOCUMENTS

KR   10-2017-0022088 A   3/2017

*Primary Examiner* — Jason A Pringle-Parker
(74) *Attorney, Agent, or Firm* — Cha & Reiter LLC

(57) ABSTRACT

Various embodiments of the present disclosure relate to an electronic device and a method of providing an augmented reality object thereof. The electronic device includes: a touchscreen; a first camera capturing a first image; a second camera capturing a second image; a processor operatively coupled with the touchscreen, the first camera, and the second camera; and a memory operatively coupled with the processor, wherein the memory stores instructions, when executed, causing the processor to: display the first image captured via the first camera on the touchscreen; receive a user input for adding at least one augmented reality object having at least one reflective surface on the first image; acquire the second image via the second camera in response to the user input; identify an angle of the reflective surface; and perform perspective transformation on the second image on the basis of the identified angle, and apply at least part of
(Continued)

the perspective-transformed second image to each reflective surface of the augmented reality object. Other various embodiments are possible.

16 Claims, 18 Drawing Sheets

(51) Int. Cl.
    *G06T 15/20*     (2011.01)
    *H04N 5/247*     (2006.01)

(52) U.S. Cl.
    CPC ......... *H04N 5/247* (2013.01); *G06T 2200/24* (2013.01); *G06T 2219/2016* (2013.01); *G06T 2219/2021* (2013.01)

(56) References Cited

U.S. PATENT DOCUMENTS

| | | | |
|---|---|---|---|
| 9,716,842 B1* | 7/2017 | Worley | G09G 5/377 |
| 9,747,719 B2* | 8/2017 | Dehais | G06T 17/10 |
| 10,013,796 B2* | 7/2018 | Kornilov | G06K 9/00281 |
| 10,445,938 B1* | 10/2019 | Poliakov | G06T 7/62 |
| 2005/0243192 A1* | 11/2005 | Allman | G06T 7/215 |
| | | | 348/239 |
| 2012/0244939 A1 | 9/2012 | Braun | |
| 2012/0313955 A1* | 12/2012 | Choukroun | G06T 19/006 |
| | | | 345/582 |
| 2013/0088490 A1* | 4/2013 | Rasmussen | G06T 19/006 |
| | | | 345/421 |
| 2014/0176565 A1* | 6/2014 | Adeyoola | G06F 16/5854 |
| | | | 345/473 |
| 2014/0184644 A1 | 7/2014 | Sharma et al. | |
| 2015/0120496 A1* | 4/2015 | Watson | G06T 19/20 |
| | | | 705/26.8 |
| 2015/0244942 A1* | 8/2015 | Shabtay | H04N 5/2257 |
| | | | 348/240.3 |
| 2015/0279113 A1* | 10/2015 | Knorr | G06T 15/50 |
| | | | 345/633 |
| 2016/0247320 A1 | 8/2016 | Yuen et al. | |
| 2016/0275483 A1 | 9/2016 | Zhou | |
| 2017/0069143 A1 | 3/2017 | Salter et al. | |
| 2017/0358092 A1 | 12/2017 | Bleibel et al. | |
| 2018/0068490 A1* | 3/2018 | Holmes | H04N 21/23418 |
| 2019/0179405 A1* | 6/2019 | Sun | G06Q 30/0643 |

* cited by examiner

ELECTRONIC DEVICE AND METHOD FOR PROVIDING AUGMENTED REALITY OBJECT THEREFOR

CROSS-REFERENCE TO RELATED APPLICATION(S)

This application is a National Phase Entry of PCT International Application No. PCT/KR2019/002109, which was filed on Feb. 21, 2019, and claims priority to Korean Patent Application No. 10-2018-0022202, which was filed on Feb. 23, 2018, the contents of which are incorporated herein by reference.

TECHNICAL FIELD

Various embodiments of the present disclosure relate to an electronic device and a method of providing an augmented reality object thereof.

BACKGROUND ART

Electronic devices (e.g., a mobile terminal, a smartphone, a wearable device, etc.) may provide various functions. For example, in addition to a basic voice communication function, the smartphone may provide a short-range wireless communication (Bluetooth, Wireless Fidelity (Wi-Fi), Near Field Communication (NFC), etc.) function, a mobile communication ($3^{rd}$ Generation (3G), $4^{th}$ Generation (4G), $5^{th}$ Generation (5G), etc.) function, a music or video playback function, a shooting function, a navigation function, or the like.

Meanwhile, recently, there is a growing number of electronic devices providing Augmented Reality (AR). The AR may provide one image by overlaying a virtual object on a preview image captured via a camera.

DISCLOSURE OF INVENTION

Technical Problem

In general, when an object (e.g., sunglasses) having a reflective material is displayed, an environment of the opposite side may be reflected thereon. However, the electronic device simply displays only a designated virtual object (e.g., sunglasses) on a captured image (e.g., an image capturing a person), thereby not providing a sense of reality. For example, when a user wears real sunglasses, an environment of the opposite side may be reflected and displayed on the sunglasses. However, when virtual sunglasses are applied to a captured image, the virtual sunglasses may not display a reflected image of the environment of the opposite side, thereby not providing a high sense of reality.

In order to solve the aforementioned problem, various embodiments of the present disclosure may provide a realistic augmented reality object.

Solution to Problem

An electronic device according to various embodiments of the present disclosure, for example, may include: a touchscreen; a first camera capturing a first image; a second camera capturing a second image; a processor operatively coupled with the touchscreen, the first camera, and the second camera; and a memory operatively coupled with the processor. The memory may store instructions, when executed, causing the processor to: display the first image captured via the first camera on the touchscreen; receive a user input for adding at least one augmented reality object having at least one reflective surface on the first image; acquire the second image via the second camera in response to the user input; identify an angle of the reflective surface; and perform perspective transformation on the second image on the basis of the identified angle, and apply at least part of the perspective-transformed second image to each reflective surface of the augmented reality object.

A method of providing an augmented reality object of an electronic device according to various embodiments of the present disclosure, for example, may include: displaying a first image captured via a first camera on a display; receiving a user input for adding at least one augmented reality object having at least one reflective surface on the first image; acquiring a second image via a second camera in response to the user input; identifying an angle of the reflective surface; and performing perspective transformation on the second image on the basis of the identified angle, and apply at least part of the perspective-transformed second image to each reflective surface of the augmented reality object.

Advantageous Effects of Invention

Various embodiments of the present disclosure can increase a sense of reality when a virtual object (e.g., an Augmented Reality (AR) sticker of sunglasses or the like) having a reflective surface is provided, since an image corresponding to a real environment of the opposite side can be displayed on a reflective surface of the virtual object.

BEST MODE FOR CARRYING OUT THE INVENTION

Figure 1:
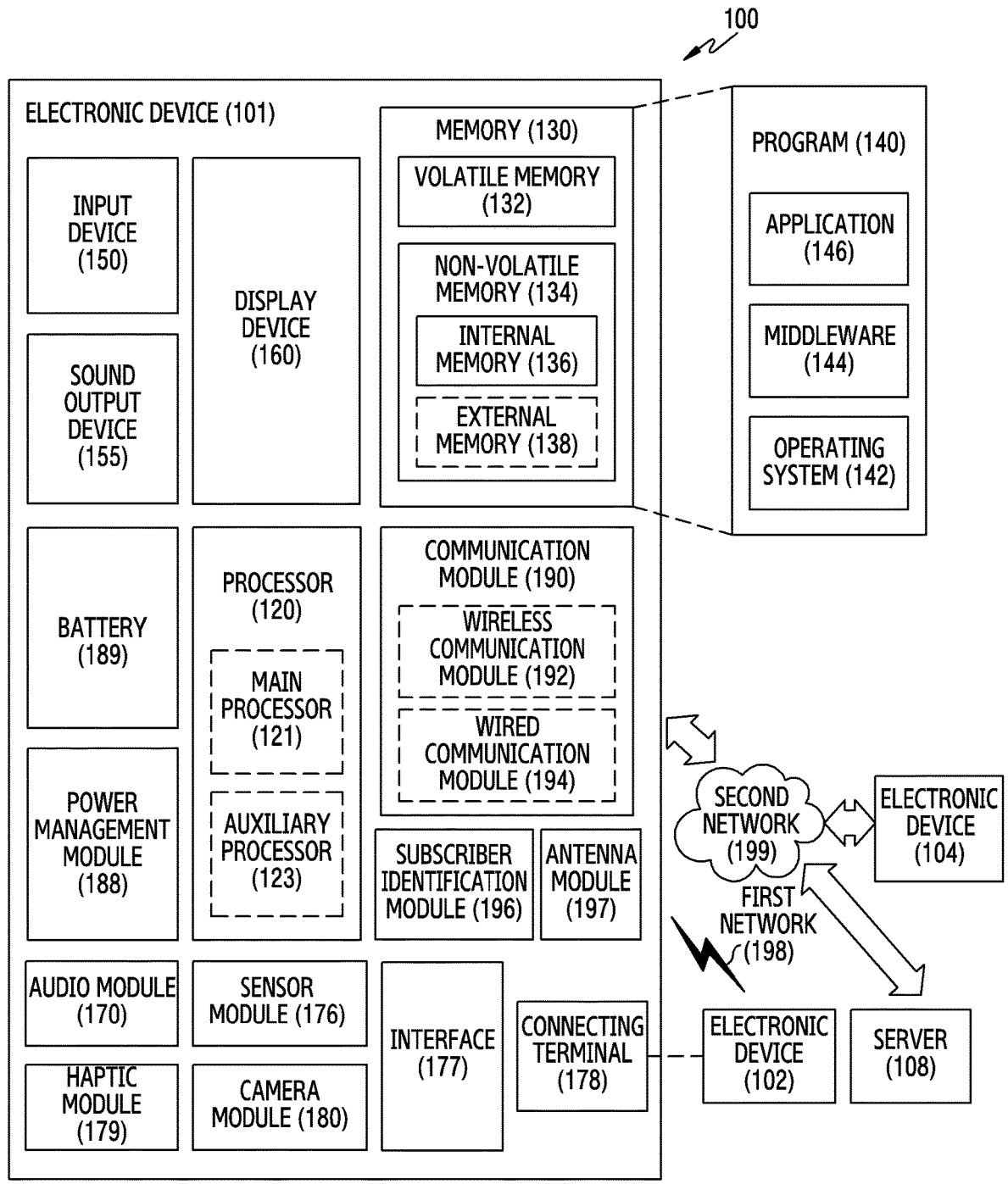
FIG. 1 is a block diagram of an electronic device in a network environment according to various embodiments of the present disclosure.

Hereinafter, various embodiments of the present invention will be described with reference to the accompanying drawings. In the disclosure, particular embodiments are illustrated by way of example in the drawings and a detailed description related thereto is made, but the particular embodiments and the related detailed description are not intended to limit various embodiments of the present invention to particular forms. For example, it will be apparent to those having common knowledge in the technical field to which the present invention pertains that embodiments of the present invention may be variously modified.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the haptic module 179, the antenna module 197, or the SIM 196) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images.

According to an embodiment, the camera module 180 may include one or more lenses, image sensors, image signal processors, or flashes. For example, the camera module 180 may include a first camera (not shown) located at a front face of the electronic device 101 and a second camera (not shown) located at a rear face. The first camera and/or the second camera may be a multi-camera. For example, the first camera and/or the second camera may be a dual camera including a wide-angle camera and a telephoto camera. According to some embodiments, the first camera and/or the second camera may be a dual camera including a normal camera (or a standard camera) and a telephoto camera. According to some embodiments, the first camera and/or the second camera may be a dual camera including a wide-angle camera and a normal camera.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device (e.g., the electronic device 101) according to various embodiments of the present disclosure may include: a touchscreen (e.g., the display device 160); a first camera capturing a first image; a second camera capturing a second image; a processor (e.g., the processor 120) operatively coupled with the touchscreen, the first camera, and the second camera; and a memory (e.g., the memory 130) operatively coupled with the processor. The memory may store instructions, when executed, causing the processor to: display the first image captured via the first camera on the touchscreen; receive a user input for adding at least one augmented reality object having at least one reflective surface on the first image; acquire the second image via the second camera in response to the user input; identify an angle of the reflective surface; and perform perspective transformation on the second image on the basis of the identified angle, and apply at least part of the perspective-transformed second image to each reflective surface of the augmented reality object.

According to various embodiments, the instruction for applying at least part of the perspective-transformed second image to the reflective surface may include an instruction for correcting the perspective-transformed second image in response to at least one of a size, shape, inclination, curvature, and direction of the reflective surface, and for cropping a part of an area.

According to various embodiments, the instruction for applying at least part of the perspective-transformed second image to the reflective surface may include an instruction for adjusting a transparency of the perspective-transformed second image according to a material of the reflective surface.

According to various embodiments, the memory may further store an instruction for removing a photographer from the second image if the second image includes the photographer.

According to various embodiments, the memory may further store instructions for: disposing the augmented reality object to a designated area of a subject included in the first image, identifying a distance between a subject to which the augmented reality object is displayed and the first camera, and adjusting a size of the perspective-transformed second image according to the distance.

According to various embodiments, the instruction for adjusting the size of the perspective-transformed second image may include instructions for: increasing the size of the perspective-transformed second image if the distance to the subject is less than or equal to a designed first reference value; maintaining the size of the perspective-transformed second image if the distance to the subject exceeds the first reference value and less than or equal to a designated second reference value; and decreasing the size of the perspective-transformed second image if the distance to the subject exceeds the second reference value.

According to various embodiments, the second camera may be a dual camera including a standard camera and a telephoto camera. The instruction for acquiring the second image may include an instruction for acquiring the standard image via the standard camera, and acquiring a telephoto image by using the telephoto camera.

According to various embodiments, the memory may further store instructions for: performing the perspective transformation by using the telephoto image if a distance to a subject to which the augmented reality object is applied is less than or equal to the third reference value; and performing the perspective transformation by using the standard image if the distance to the subject exceeds the third reference value.

According to various embodiments, the instruction for acquiring the telephoto image by using the telephoto camera may include instructions for: identifying whether there is at least one subject located at a distance less than or equal to a designated third reference value; and activating the telephoto camera if there is at least one subject located at the distance less than or equal to the third reference value.

According to various embodiments, the memory may further store instructions for: moving the augmented reality object according to a movement of a subject; and performing perspective transformation on the second image on a real-time basis in response to the movement of the augmented reality object.

Figure 2:
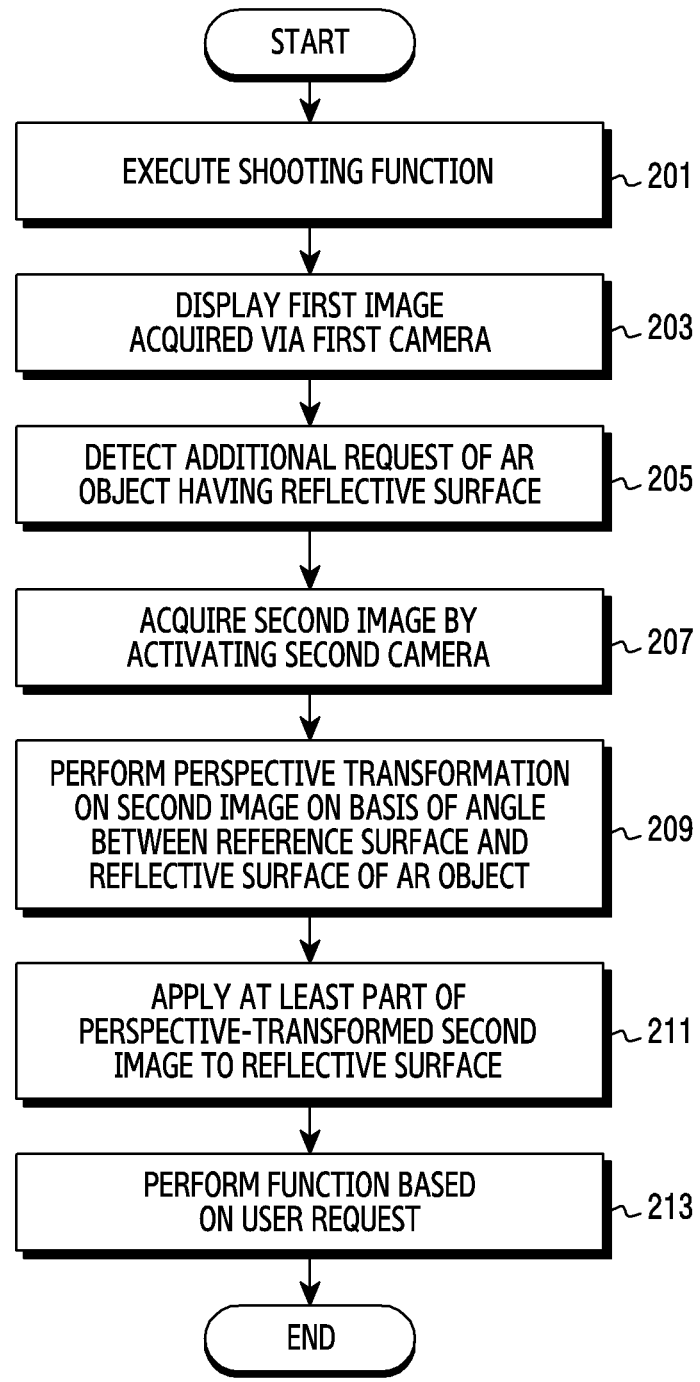
FIG. 2 is a flowchart illustrating a method of providing an augmented reality object of an electronic device according to an embodiment of the present disclosure.
Figure 3A:
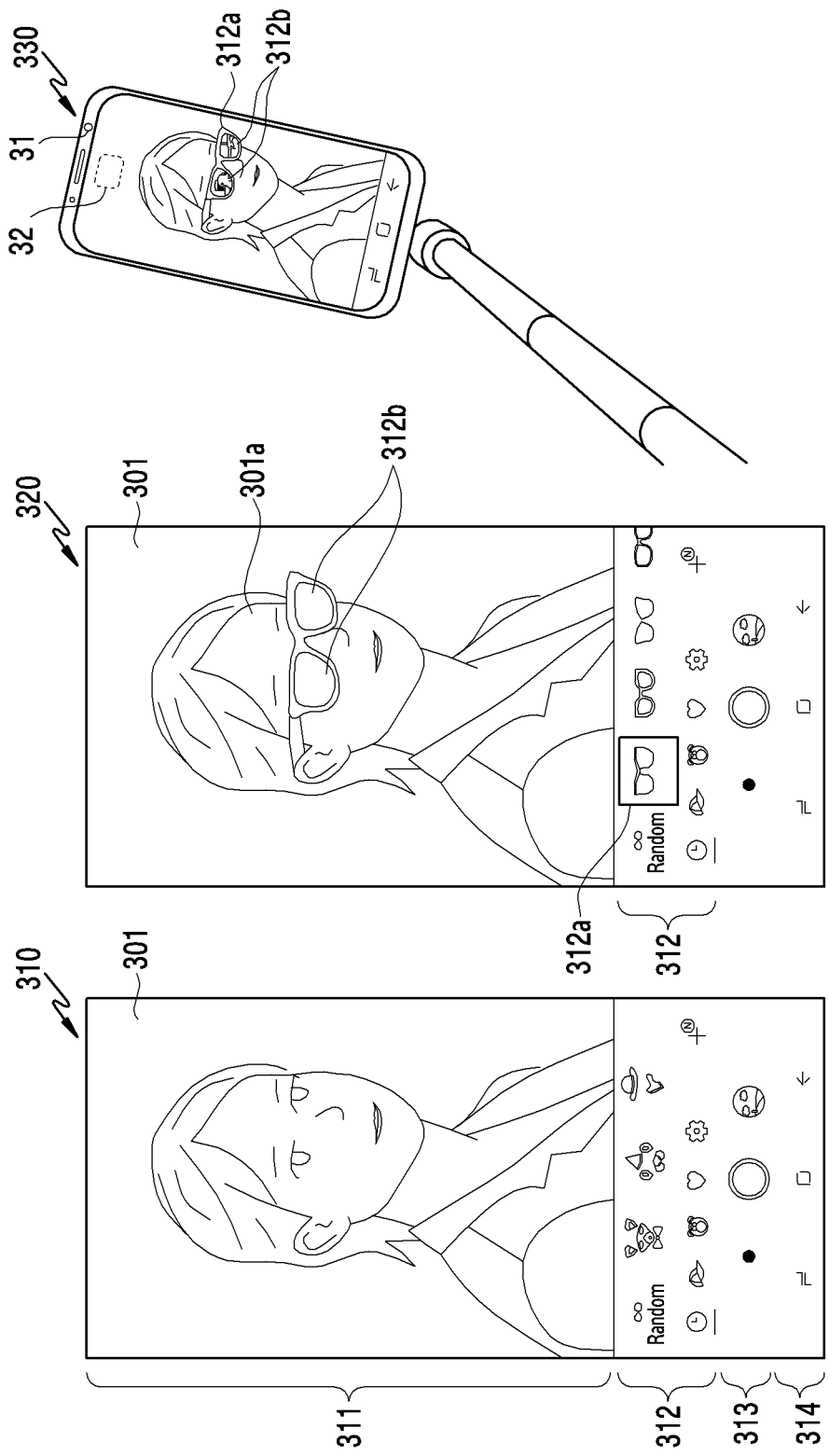
FIGS. 3A and 3B are an exemplary diagram for describing a method of providing an augmented reality object of an electronic device according to an embodiment of the present disclosure.
Figure 3B:
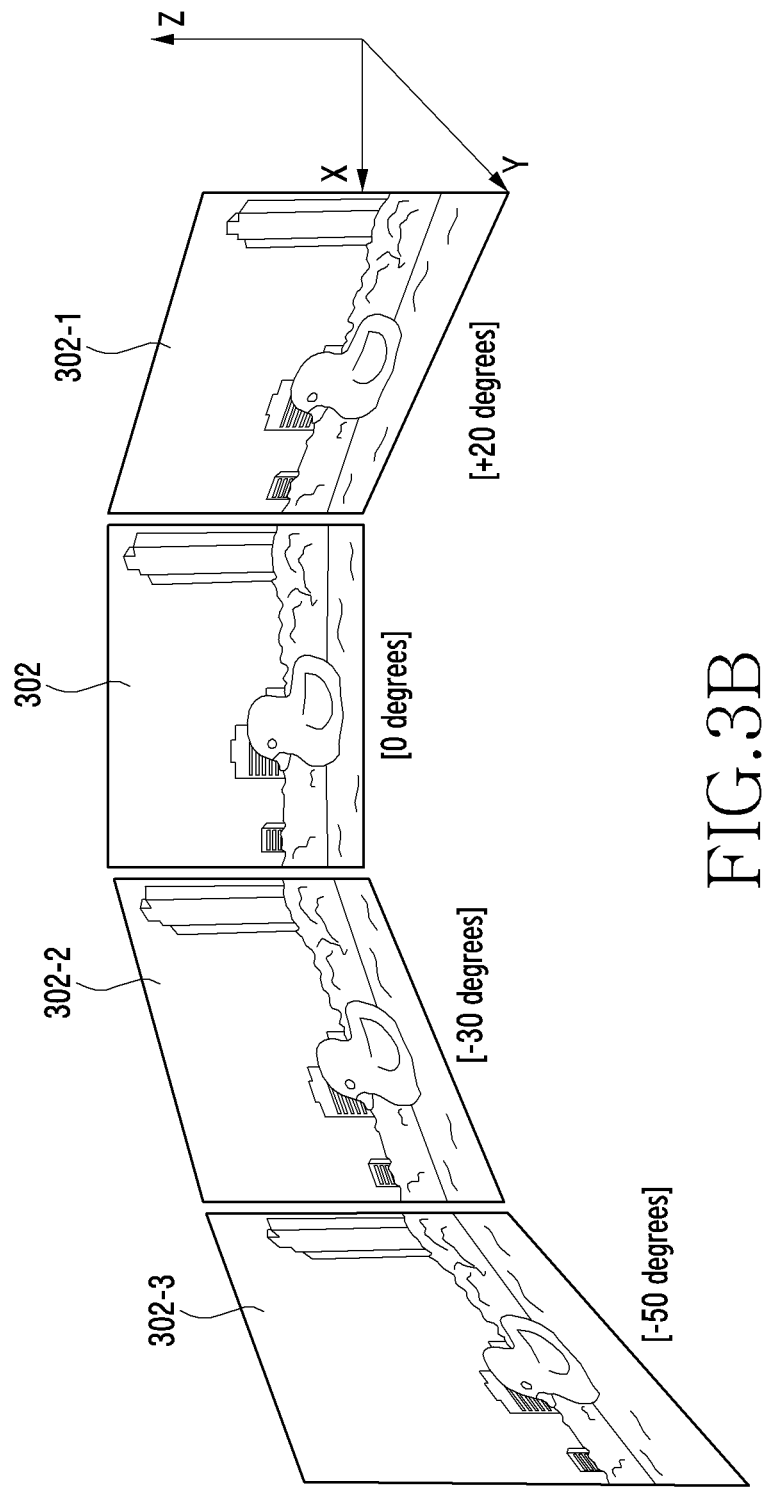

FIG. 2 is a flowchart illustrating a method of providing an Augmented Reality (AR) object of an electronic device according to an embodiment of the present disclosure, and FIG. 3A and FIG. 3B are exemplary diagrams for describing a method of providing an AR object of an electronic device according to an embodiment of the present disclosure.

Referring to FIG. 2 to FIG. 3B, in operation 201, a processor (e.g., the processor 120 of FIG. 1) of an electronic device (e.g., the electronic device 101 of FIG. 1) according to an embodiment of the present disclosure may execute a shooting function. The shooting function may be executed by a request of a user.

In operation 203, the processor according to an embodiment of the present disclosure may display a first image (e.g., a preview image) acquired via a first camera 31 (e.g., a front camera) on a display (e.g., the display device 160). For example, as shown in the figure indicated by a reference numeral 310 of FIG. 3A, the processor may display a first image 301 acquired via the first camera 31 on a first area 311, may display a plurality of AR objects (e.g., sunglasses, a hat, a hairband, an earring, a character, an emoticon, etc.) on a second area 312, may display a shooting-related menu on a third area 313, and may display soft keys on a fourth area 314. The second area 312 is scrollable (e.g., at least one of left-to-right scroll and up-to-down scroll).

According to some embodiments, the fourth area 314 may be displayed in an overlay form when there is a request (e.g. a touch at a lower portion, a drag from bottom to top in a screen, etc.). According to some embodiments, the second area 312 and the third area 313 may be one area. According to another embodiment, the second area 312 to the fourth area 314 may be one area.

In operation 205, the processor according to an embodiment of the present disclosure may detect an additional request of an AR object having at least one reflective surface. For example, as shown in the figure indicated a reference numeral 320 of FIG. 3A, when sunglasses 312a are selected among AR objects displayed on the second area 312, the processor may display the sunglasses 312a at an eye area of a subject 301a. According to some embodiments, the processor may transform the sunglasses 312a (e.g., determine a direction and/or an inclination) depending on a direction in which the subject 301a is looking. For example, when the subject 301a is looking a front face of the electronic device (or the first camera), the processor may display the sunglasses 312a on the eye area of the subject 301a without transformation so that the sunglasses 312a also face the front face, and when the subject 301a is looking in a specific direction (e.g., a 45-degree direction with respect to an X-axis) rather than the front face, the processor may display the sunglasses 312a on the eye area by performing transformation such that the sunglasses 312a also face in the specific direction.

In operation 207, the processor according to an embodiment of the present disclosure may acquire a second image (e.g., 302 of FIG. 3B) by activating a second camera 32, in response to an additional request of the AR object. The second camera 32 may capture a direction opposite to the first camera 31, and may acquire a reflective image (or a background image) reflected on a reflective surface of the AR object.

According to some embodiments, the second camera 32 may be a multi-camera. For example, the second camera 32 may be a dual camera including a standard camera and a telephoto camera, a wide-angle camera and a telephoto camera, or a wide-angle camera and a standard camera. The processor may acquire the second image via at least one of the dual cameras depending on a distance to a subject. Detailed descriptions thereof will be described below with reference to FIG. 10 and FIG. 11.

According to some embodiments, the second camera may be a front camera, and the first camera may be a rear camera. When the second camera is the front camera, the processor may remove a photographer from the second image acquired via the second camera. Detailed descriptions thereof will be described below with reference to FIG. 12 to FIG. 13B.

In operation 209, the processor according to an embodiment of the present disclosure may perform perspective transformation on the second image on the basis of an angle of a reflective surface 312b of the AR object. For example, as shown in FIG. 3B, the second image may be transformed variously according to the angle of the reflective surface. When an angle between the reflective surface and a first reference line (e.g., a Z-axis) is "0 degrees", as shown in the figure indicated by a reference numeral 302, the second image may not be subjected to perspective transformation. When the angle is "+20 degrees", as shown in the figure indicated by a reference numeral 302-1, the second image may be transformed to a trapezoidal shape of which a right vertical side is longer. When the angle is "−30 degrees" and "−50 degrees", as shown in the figure indicated by reference numerals 302-2 and 302-3, the second image may be transformed to a trapezoidal shape of which a left vertical side is longer. The greater the absolute value of the angle, the greater the difference between the left and right sides. Similarly, the processor may perform perspective transformation by adjusting lengths of upper and lower sides of the second image 302 according to an angle between a second reference line (e.g., an X-axis) and the reflective surface.

In operation 211, the processor according to an embodiment of the present disclosure may apply at least part of the perspective-transformed second image to the reflective surface. For example, as shown in the figure indicated by a reference numeral 330 of FIG. 3A, the processor may display a part of the perspective-transformed second image on the reflective surface 312b of the sunglasses 312a. Herein, detailed descriptions on the method of applying at least part of the perspective-transformed second image to the reflective surface will be described below with reference to FIG. 4 to FIG. 9.

In operation 213, the processor according to an embodiment of the present disclosure may perform a function based on a user request. For example, the processor may synthesize and store the AR object and the first image in response to a shooting request. Alternatively, the processor may add or delete another AR object. Alternatively, the processor may move the AR object in response to a movement of the subject 301a, and may perform perspective transformation on the second image in response to a movement of the AR object. For example, when an angle between the reflective surface and a reference surface (e.g., a face perpendicular to a shooting direction) is changed by the movement of the AR object due to the movement of the subject, the processor may perform perspective transformation on the second image on a real-time basis and apply it to the reflective surface on the basis of the changed angle. Alternatively, the processor may terminate the shooting function in response to a termination request.

Figure 4:
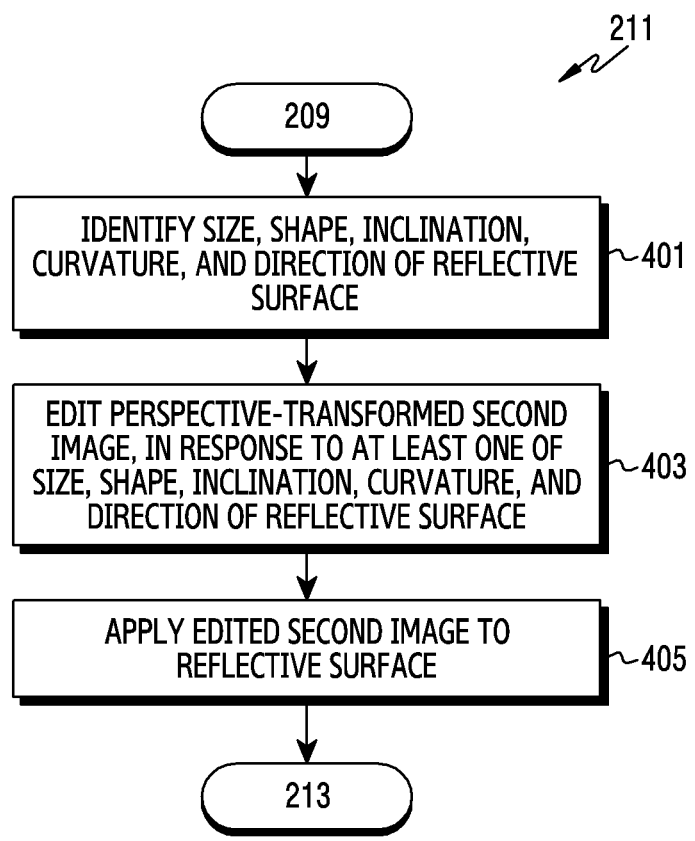
FIG. 4 is a flowchart illustrating a method of applying a second image to a reflective surface according to an embodiment of the present disclosure.

FIG. 4 is a flowchart illustrating a method of applying a second image to a reflective surface according to an embodiment of the present disclosure, and FIG. 5A to FIG. 5D are exemplary diagrams for describing a method of applying a second image to a reflective surface according to an embodiment of the present disclosure.

Figure 5A:
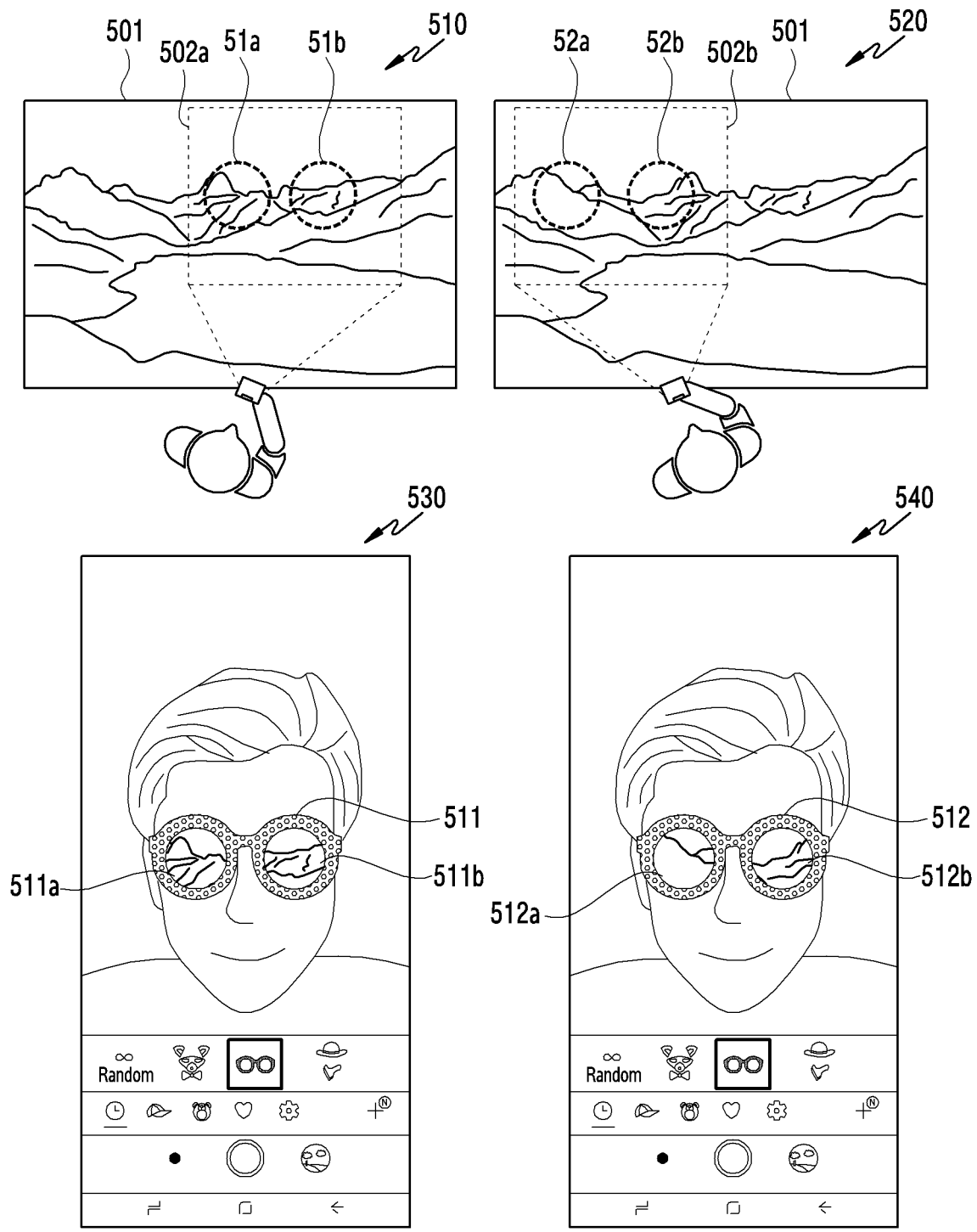
FIG. 5A to 5D are an exemplary diagram for describing a method of applying a second image to a reflective surface according to an embodiment of the present disclosure.
Figure 5B:
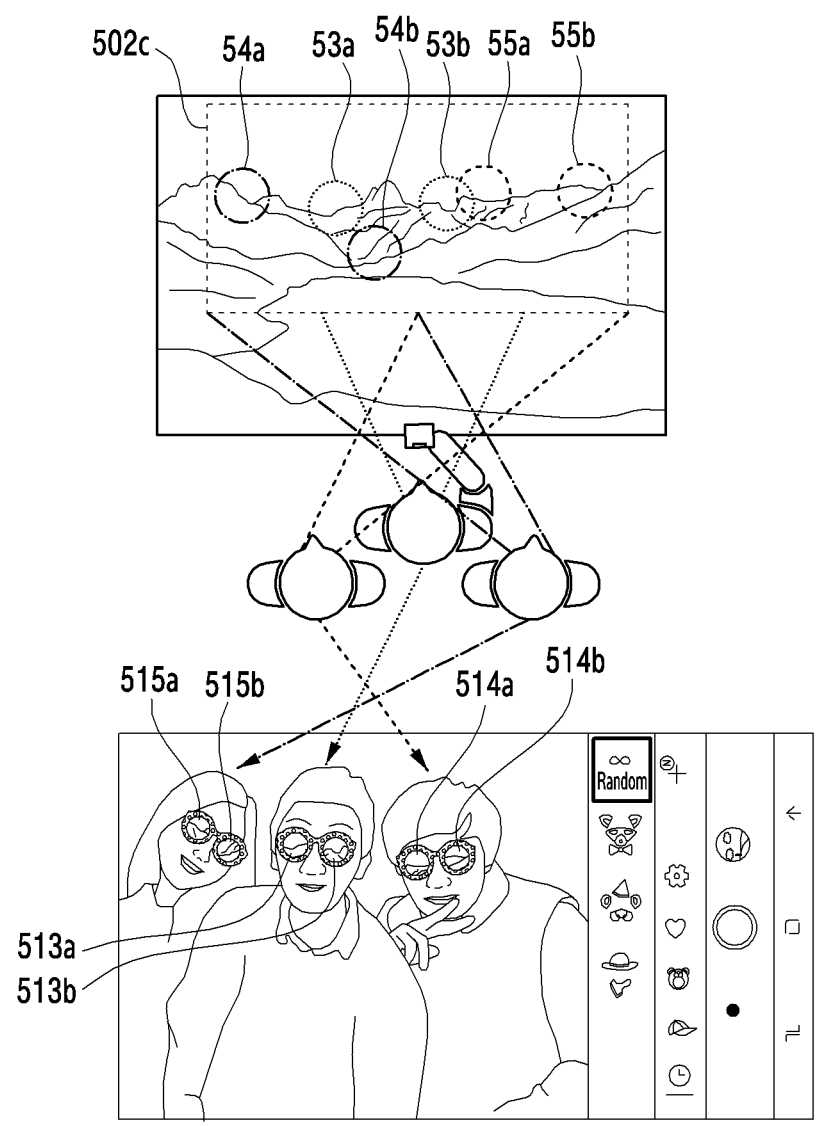
Figure 5C:
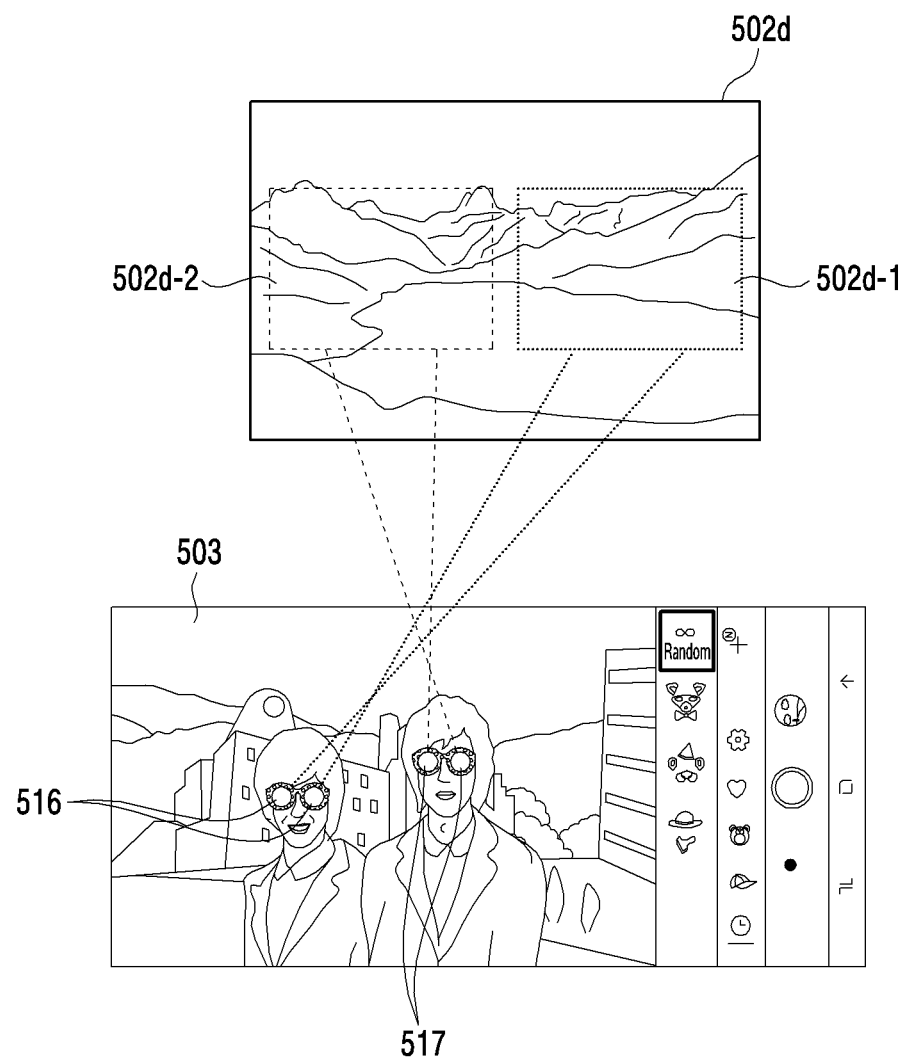
Figure 5D:
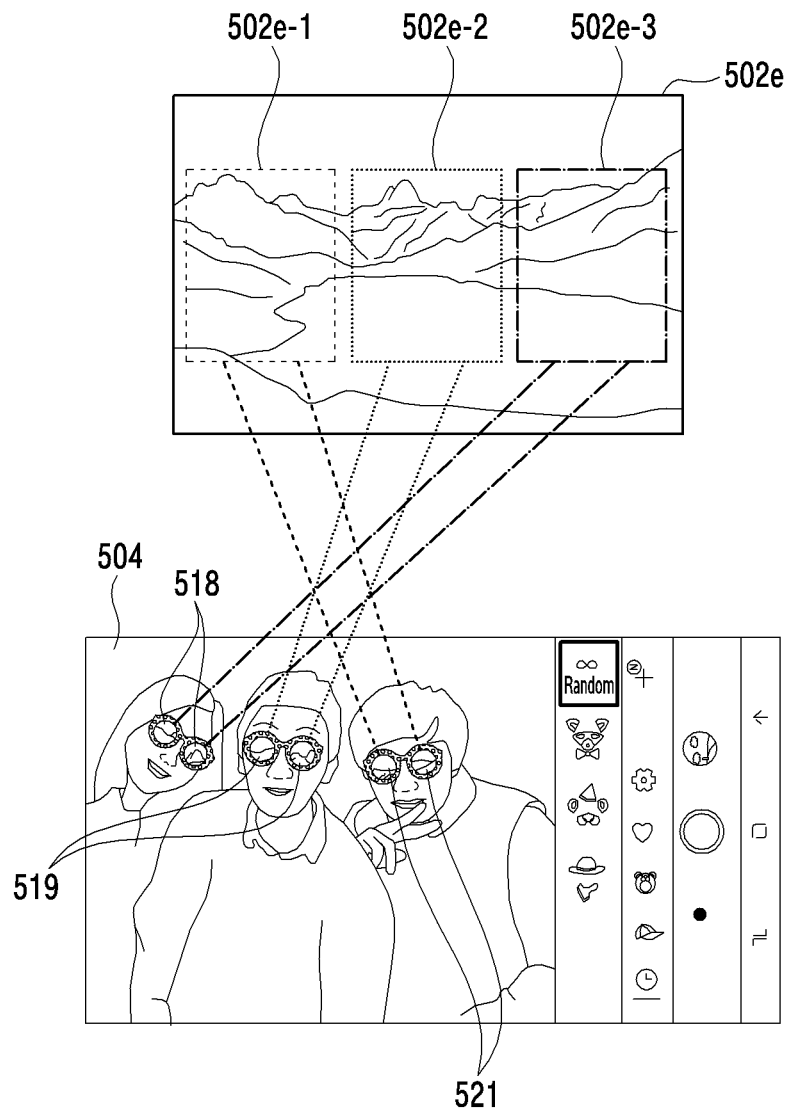

Referring to FIG. 4 to FIG. 5D, in operation 401, a processor (e.g., the processor 120 of FIG. 1) according to an embodiment of the present disclosure may identify a size, shape, inclination, curvature, and/or direction of a reflective surface.

In operation 403, the processor according to an embodiment of the present disclosure may edit (or correct) a perspective-transformed second image in response to at least one of the size, shape, inclination, curvature, and/or direction of the reflective surface. For example, the processor may crop at least part of the perspective-transformed second image so as to correspond to the size and shape of the reflective surface. According to some embodiments, the processor may correct the second image by applying a curved level (curvature) of the reflective surface, and may crop a part of the corrected second image so as to correspond to the size and shape of the reflective surface. According to another embodiment, the processor may crop a part of the second image so as to correspond to the size and shape of the reflective size, and may correct the cropped part of the second image by applying the curvature of the reflective surface.

Referring to FIG. 5A, as shown in the figure indicated by reference numerals 510 and 520, the processor may crop parts 51a, 51b, 52a, and 52b of second images 502a and 502b in response to a size, shape, inclination, curvature, and/or direction of reflective surfaces 511a, 511b, 512a, and 512b of sunglasses 511 and 512. Herein, a reference numeral 501 implies an actual background, and the reference numerals 502a and 502b imply a second image actually acquired via the second camera. Referring to the reference numerals 510 and 520, in an embodiment of the present disclosure, it can be known that the second image may vary on a real-time basis according to a shooting direction of the second camera.

In operation 405, the processor according to an embodiment of the present disclosure may apply (display) the edited second image to a reflective surface. For example, as shown in the figure indicated by reference numerals 530 and 540 of FIG. 5A, the processor may display the cropped images 51a, 51b, 52a, and 52b respectively on the reflective surfaces 511a, 511b, 512a, and 512b of the sunglasses 511 and 512.

According to some embodiments, the first image may include a plurality of subjects. For example, as shown in FIG. 5B, the first image may include three persons. The processor may identify a size, position, shape, inclination, direction, or the like of each of reflective surfaces 513a, 513b, 514a, 514b, 515a, and 515b of virtual sunglasses displayed on eye areas of the three persons. The processor may crop a part of a second image 502c on the basis of the size, position, shape, inclination, and direction of the identified reflective surfaces 513a, 513b, 514a, 514b, 515a, and 515b, and may display the cropped images 53a, 53b, 54a, 54b, 55a, and 55b respectively on the reflective surfaces 513a, 513b, 514a, 514b, 515a, and 515b.

According to some embodiments, the processor may equally divide the second image on the basis of the number of subjects (persons) included in the first image. For example, as shown in FIG. 5C, the processor may bisect a second image 502d when a first image 503 includes two persons. The processor may provide control such that a part of a first divided image 502d-1 is displayed on a reflective surface 516 of sunglasses displayed on a first person and a part of a second divided image 502d-2 is displayed on a reflective surface 517 of sunglasses displayed on a second person. As another example, as shown in FIG. 5D, the processor may trisect a second image 502e when a first image 504 includes three persons. The processor may provide control such that a part of a first divided image 502e-1 is displayed on a reflective surface 518 of sunglasses displayed on the first person, a part of a second divided image 502e-2 is displayed on a reflective surface 519 of sunglasses displayed on the second person, and a part of a third divided image 502e-3 is displayed on a reflective surface 521 of sunglasses displayed on the third person. According to some embodiments, the processor may determine the number of divisions of the second image by using an angle or direction of the reflective surface. According to some embodiments, when two out of the three persons are looking in the same or similar direction, and the other one is looking in a different direction, the processor may divide the second image into two. According to some embodiments, the processor may select one divided image to be applied to each AR object from among the images divided based on the angle or direction of the reflective surface. For example, the processor may select a divided image in a direction facing the reflective surface among the plurality of divided images and apply it to the reflective surface.

Figure 6:
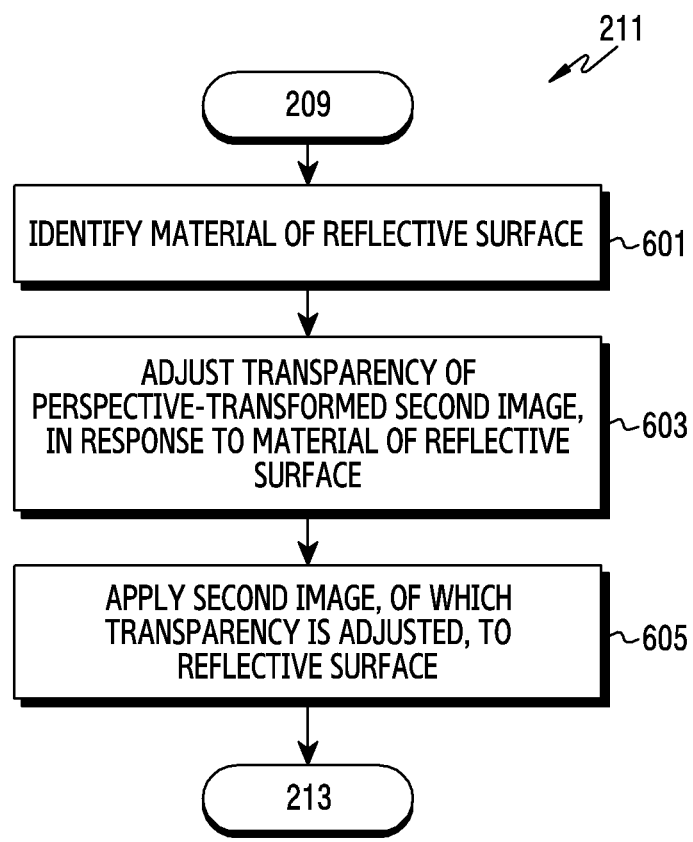
FIG. 6 is a flowchart illustrating a method of applying a second image to a reflective surface on the basis of a material of the reflective surface according to an embodiment of the present disclosure.
Figure 7:
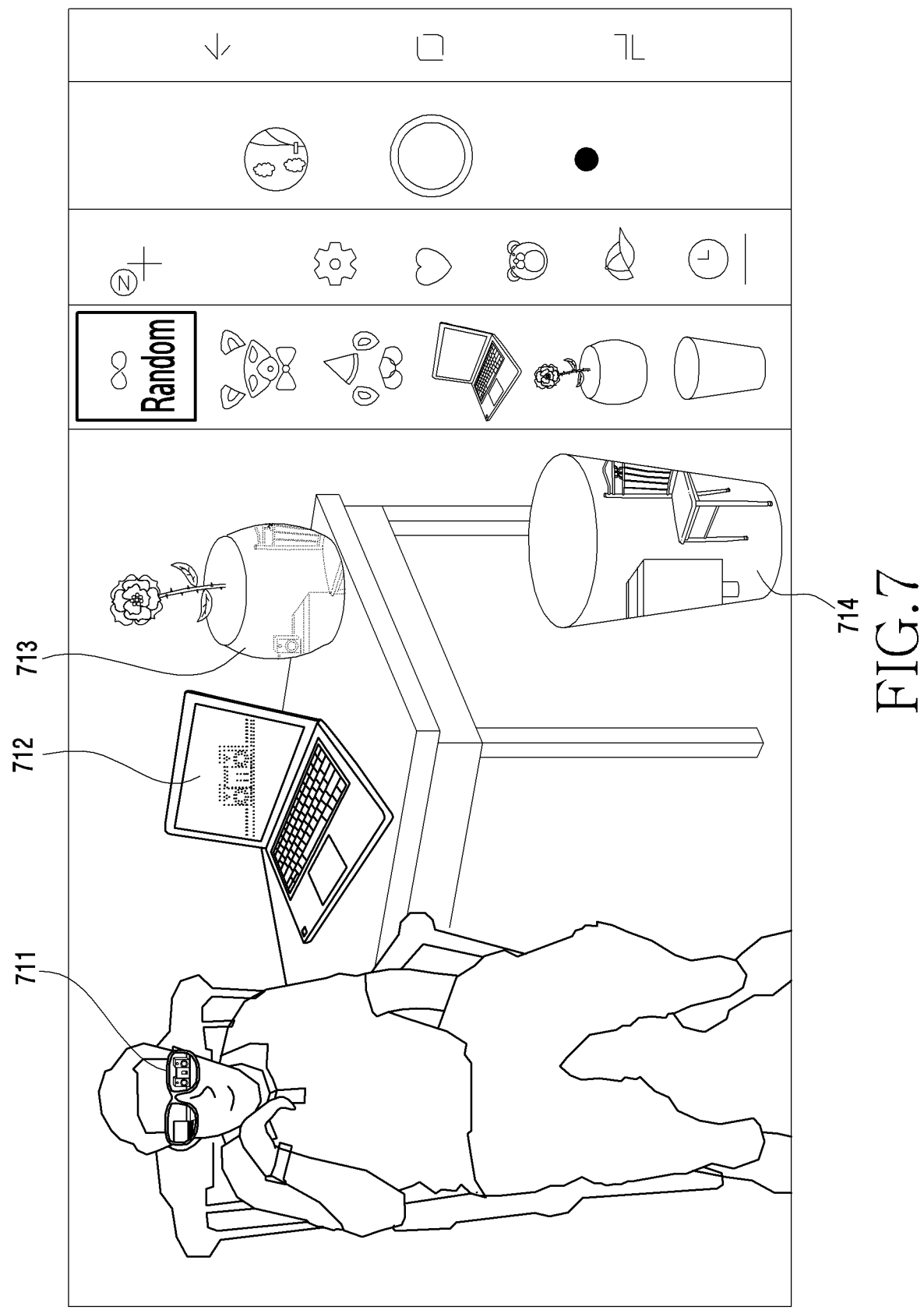
FIG. 7 is an exemplary diagram for describing a method of applying a second image to a reflective surface on the basis of a material of the reflective surface according to an embodiment of the present disclosure.

FIG. 6 is a flowchart illustrating a method of applying a second image to a reflective surface on the basis of a material of the reflective surface according to an embodiment of the present disclosure, and FIG. 7 is an exemplary diagram for describing a method of applying a second image to a reflective surface on the basis of a material of the reflective surface according to an embodiment of the present disclosure.

Referring to FIG. 6 and FIG. 7, in operation 601, a processor (e.g., the processor 120 of FIG. 1) of an electronic device (e.g., the electronic device 101 of FIG. 1) according to an embodiment of the present disclosure may identify a material of a reflective surface. For example, the processor may identify resource information of a virtual reality object to identify the material of the reflective surface.

In operation 603, the processor according to an embodiment of the present disclosure may adjust a transparency of a perspective-transformed second image, in response to the material of the reflective surface. For example, the processor may set the transparency to about 5 to 10% when the material of the reflective surface is a glass material (e.g., sunglasses, mirrors, etc.) having a higher reflectance, may set the transparency to about 10 to 30% when it is a material (e.g., metal) having an intermediate reflectance, and may set the transparency to about 30 to 50% when it is a material (e.g., ceramic) having a low reflectance. This is for exemplary purposes only, and does not limit an embodiment of the present disclosure.

In operation 605, the processor according to an embodiment of the present disclosure may apply at least part of the second image, of which the transparency is adjusted, to the reflective surface. For example, as shown in FIG. 7, the processor may allow a transparency of an image displayed on each reflective surface to be different depending on a material of a reflective surface of a plurality of AR objects (e.g., sunglasses 711, a tablet PC 712, a ceramic vase 713, and a metal (e.g., stainless) trash bin 714). For example, the processor may set a transparency of an image displayed on the reflective surface of the sunglasses 711 to 10%, may set a transparency of an image displayed on a reflective surface of the tablet PC 712 to 20%, may set a transparency of an image displayed on a reflective surface of the vase 713 to 50%, and may set a transparency of an image displayed on a reflective surface of the trash bin 714 to 30%. Herein, the transparency value is for exemplary purposes only, and does not limit embodiments of the present disclosure.

According to some embodiments, the processor may allow the transparency of the image displayed on each reflective surface to be different, even in case of the same type of AR object (e.g., sunglasses). For example, the processor may determine the transparency of the image displayed on the reflective surface differently depending on color (e.g., black or brown), density, or the like of each sunglasses.

Figure 8:
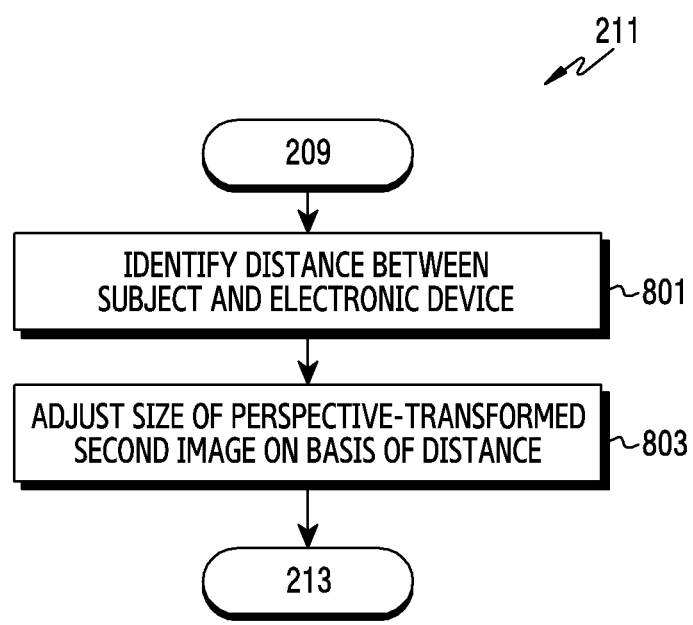
FIG. 8 is a flowchart illustrating a method of applying a second image to a reflective surface on the basis of a distance to a subject according to an embodiment of the present disclosure.
Figure 9:
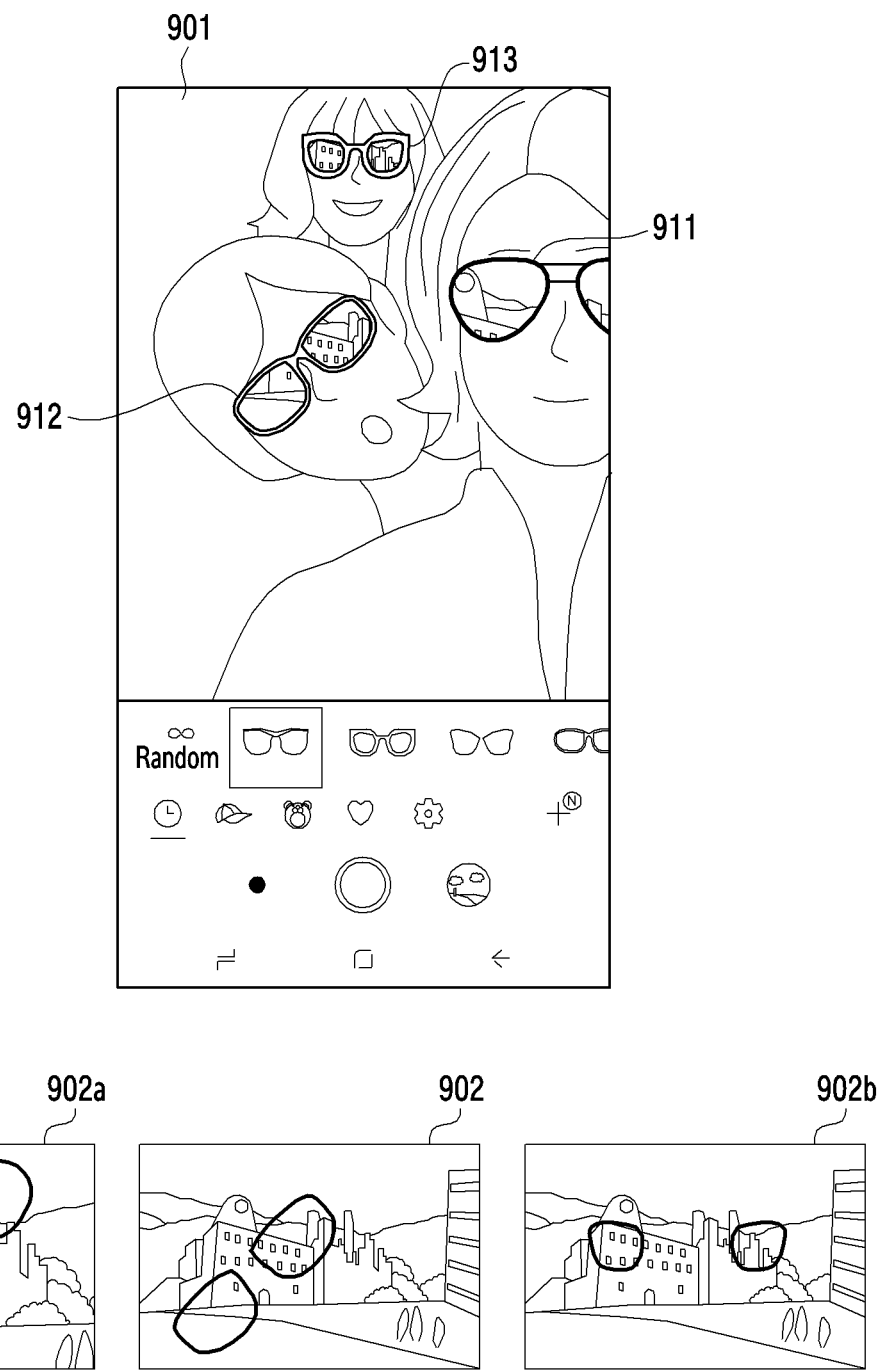
FIG. 9 is an exemplary diagram for describing a method of applying a second image to a reflective surface on the basis of a distance to a subject according to an embodiment of the present disclosure.

FIG. 8 is a flowchart illustrating a method of applying a second image to a reflective surface on the basis of a distance to a subject according to an embodiment of the present disclosure, and FIG. 9 is an exemplary diagram for describing a method of applying a second image to a reflective surface on the basis of a distance to a subject according to an embodiment of the present disclosure.

Referring to FIG. 8 and FIG. 9, in operation 801, a processor (e.g., the processor 120 of FIG. 1) of an electronic device (e.g., the electronic device 101 of FIG. 1) according to an embodiment of the present disclosure may identify (or measure) a distance between a subject and the electronic device. The processor may identify the distance by using a distance measurement sensor (e.g., an infrared sensor or a depth camera) or the like.

In operation 803, the processor according to an embodiment of the present disclosure may adjust a size of a perspective-transformed second image on the basis of the distance. For example, the processor may adjust the size of the second image through enlargement (e.g., zoom-out) if the distance to the subject is close or through reduction (e.g., zoom-in) if the distance to the subject is far.

According to some embodiments, in the presence of a plurality of subjects, the processor may generate a plurality of images by adjusting the size of the second image depending on the distance to each subject. For example, as shown in FIG. 9, a first image 901 may include a first person located within a first range, a second person located within a second range, and a third person located within a third range. The processor may enlarge a second image 902 by a designated first size to generate an enlarged image 902a and may reduce the second image 902 by a designated second size to generate a reduced image 902b. The processor may crop a part of the enlarged image 902a to apply it to a reflective surface of virtual sunglasses 911 of the first person, may crop a part of the second image 902 to apply it to a reflective surface of virtual sunglasses 912 of the second person, and may crop a part of the reduced image 902b to apply it to a reflective surface of virtual sunglasses 913 of the third person.

Each example of applying at least part of the second image to the reflective surface has been described above with reference to FIG. 4 to FIG. 9. However, it will be apparent to those ordinarily skilled in the art that at least two of the aforementioned embodiments can be combined.

Figure 10:
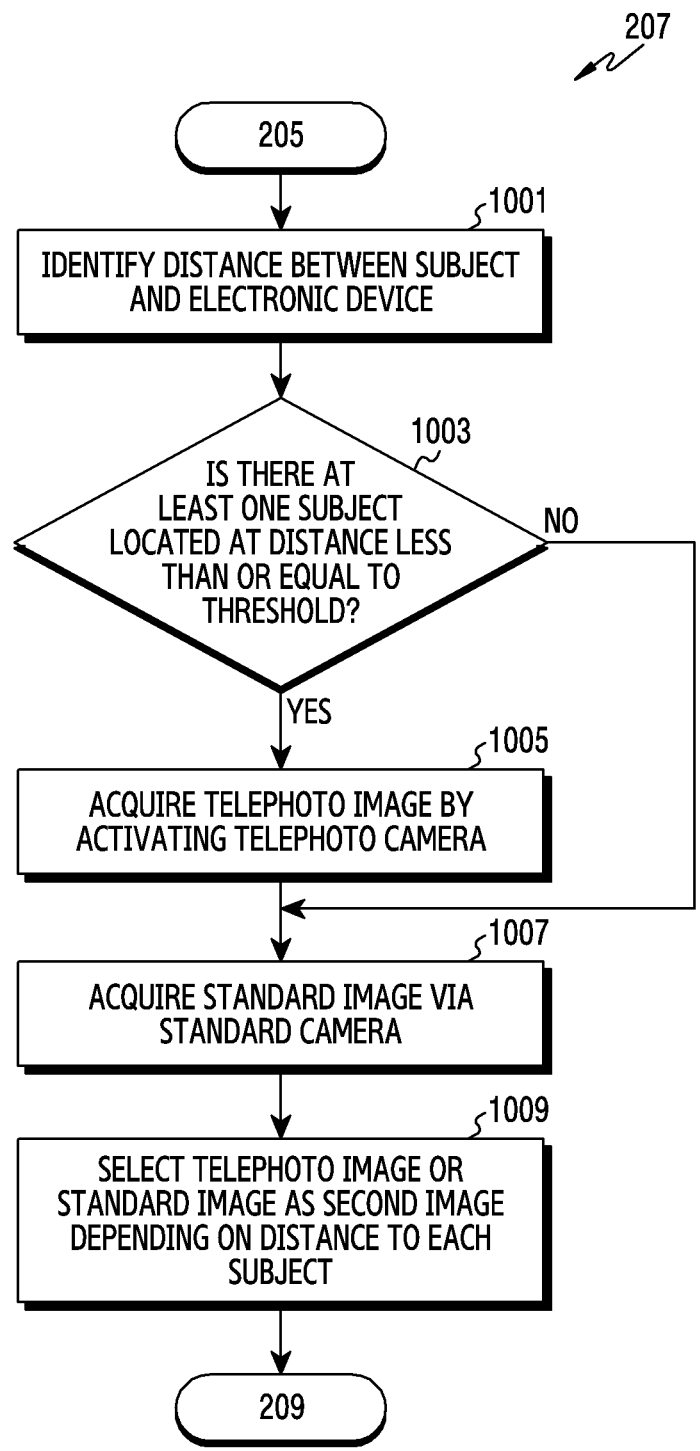
FIG. 10 is a flowchart illustrating a method of acquiring a second image via a multi-camera according to an embodiment of the present disclosure.
Figure 11:
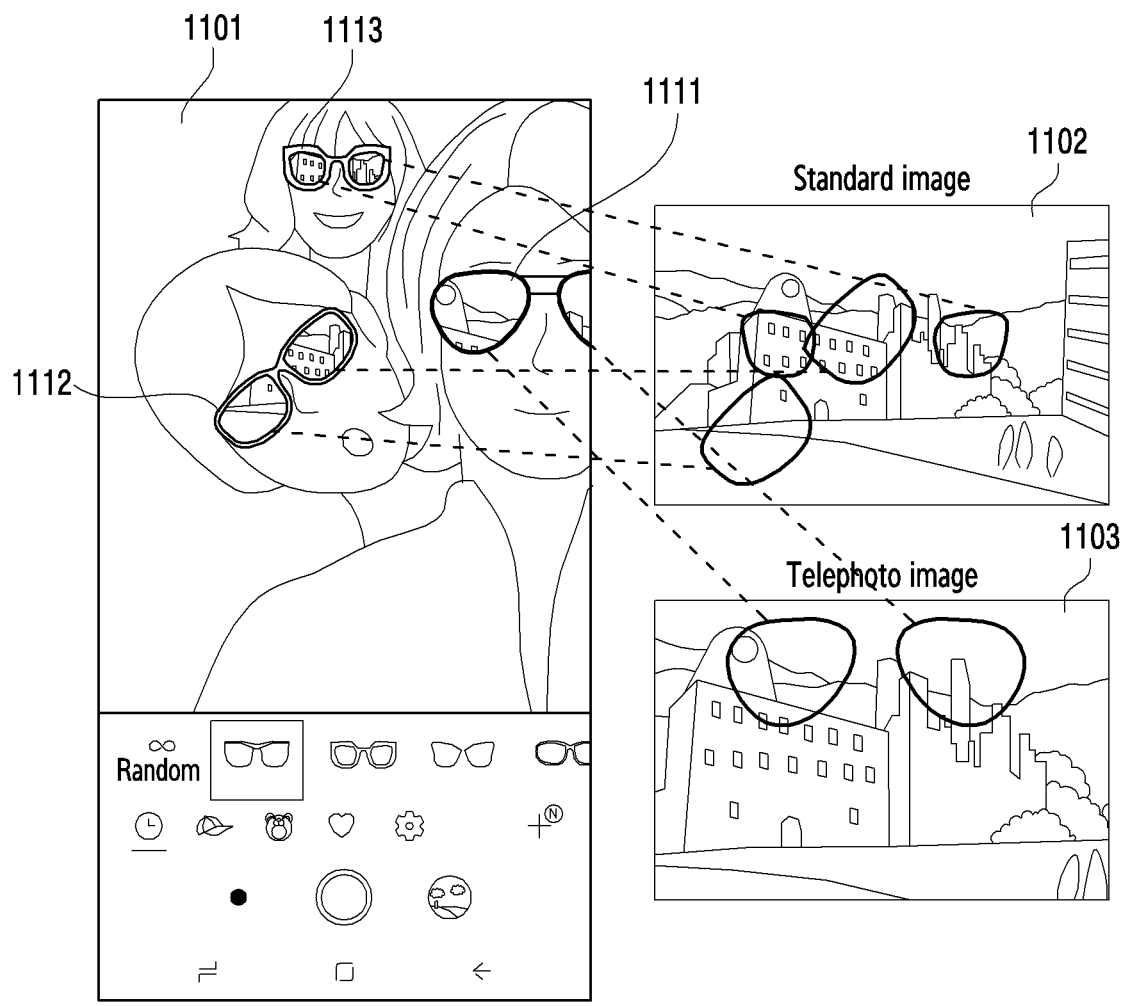
FIG. 11 is an exemplary diagram for describing a method of acquiring a second image via a multi-camera according to an embodiment of the present disclosure.

FIG. 10 is a flowchart illustrating a method of acquiring a second image via a multi-camera according to an embodiment of the present disclosure, and FIG. 11 is an exemplary diagram for describing a method of acquiring a second image via a multi-camera according to an embodiment of the present disclosure.

Prior to the detailed description, a case where a second camera is a dual camera including a standard camera and a telephoto camera will be described for example. However, an embodiment of the present disclosure is not limited thereto, and thus the second camera may be a dual camera including either a wide-angle camera and a standard camera or a wide-angle camera and a telephoto camera. According to some embodiments, the second camera may be a multi-camera including at least three cameras.

Referring to FIG. 10 and FIG. 11, in operation 1001, a processor (e.g., the processor 120 of FIG. 1) of an electronic device (e.g., the electronic device 101 of FIG. 1) according to an embodiment of the present disclosure may identify (or measure) a distance between a subject and the electronic device.

In operation 1003, the processor according to an embodiment of the present disclosure may identify whether there is at least one subject located at a distance less than or equal to a designated threshold. If it is identified in operation 1003 that there is no at least one subject located at the distance less than or equal to the threshold, the processor may proceed to operations 1007 described below. Otherwise, if it is identified in operation 1003 that there is at least one subject located at the distance less than or equal to the threshold, in operation 1005, the processor may acquire a telephoto image by activating a telephoto camera.

In operation 1007, the processor according to an embodiment of the present disclosure may acquire a standard image via a standard camera.

In operation 1009, the processor according to an embodiment of the present disclosure may select the telephoto image and/or the standard image as the second image depending on a distance to each subject. For example, as shown in FIG. 11, if a first image 1101 includes at least one subject inside a threshold range and includes at least one subject outside the threshold range, the processor may select a standard image 1102 as the second image related to at least one subject located outside the threshold range, and may select a telephoto image 1103 as the second image related to at least one subject located inside the threshold range. The processor may apply a part of the telephoto image 1103 to a reflective surface of first sunglasses 1111, and may apply a part of the standard image 1102 to a reflective surface of second sunglasses 1112 and third sunglasses 1113.

According to some embodiments, if at least one subject exists only inside the threshold range, the processor may select the telephoto image 1103 as the second image related to the at least one subject. Alternatively, if at least one subject exists only outside the threshold range, the processor may select the standard image 1102 as the second image related to the at least one subject.

Figure 12:
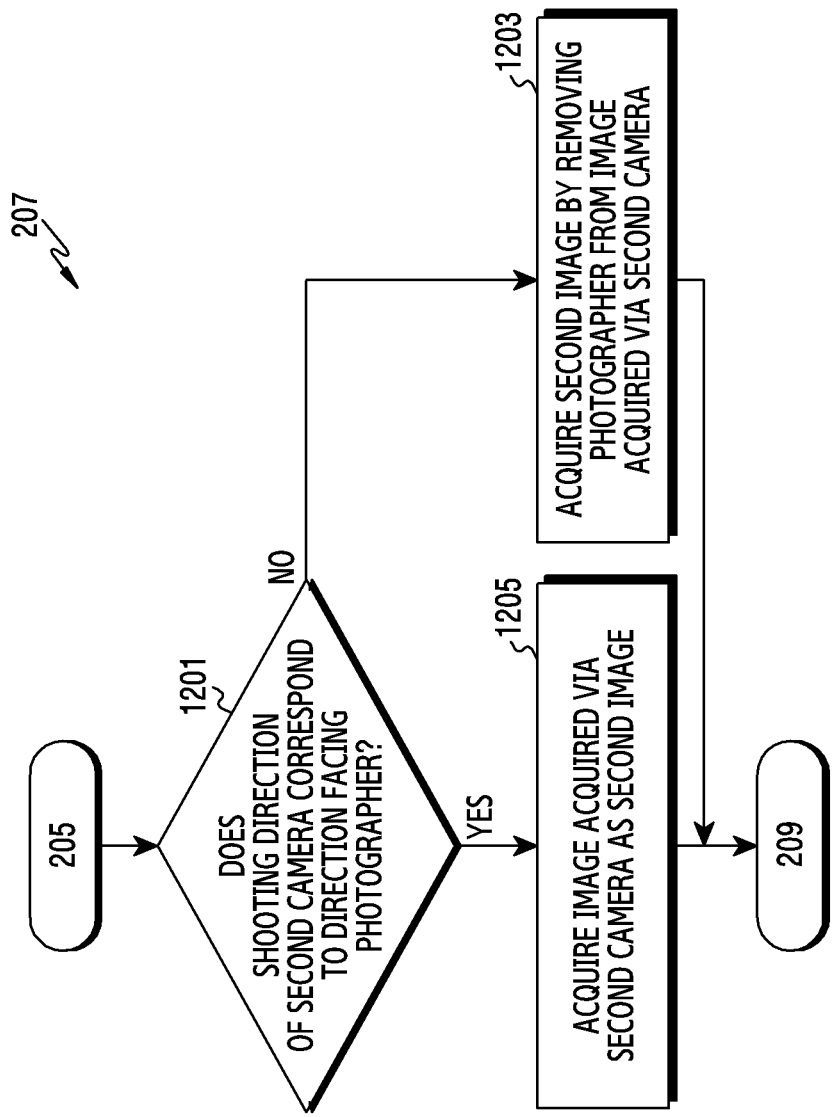
FIG. 12 is a flowchart illustrating a method of acquiring a second image according to an embodiment of the present disclosure.
Figure 13A:
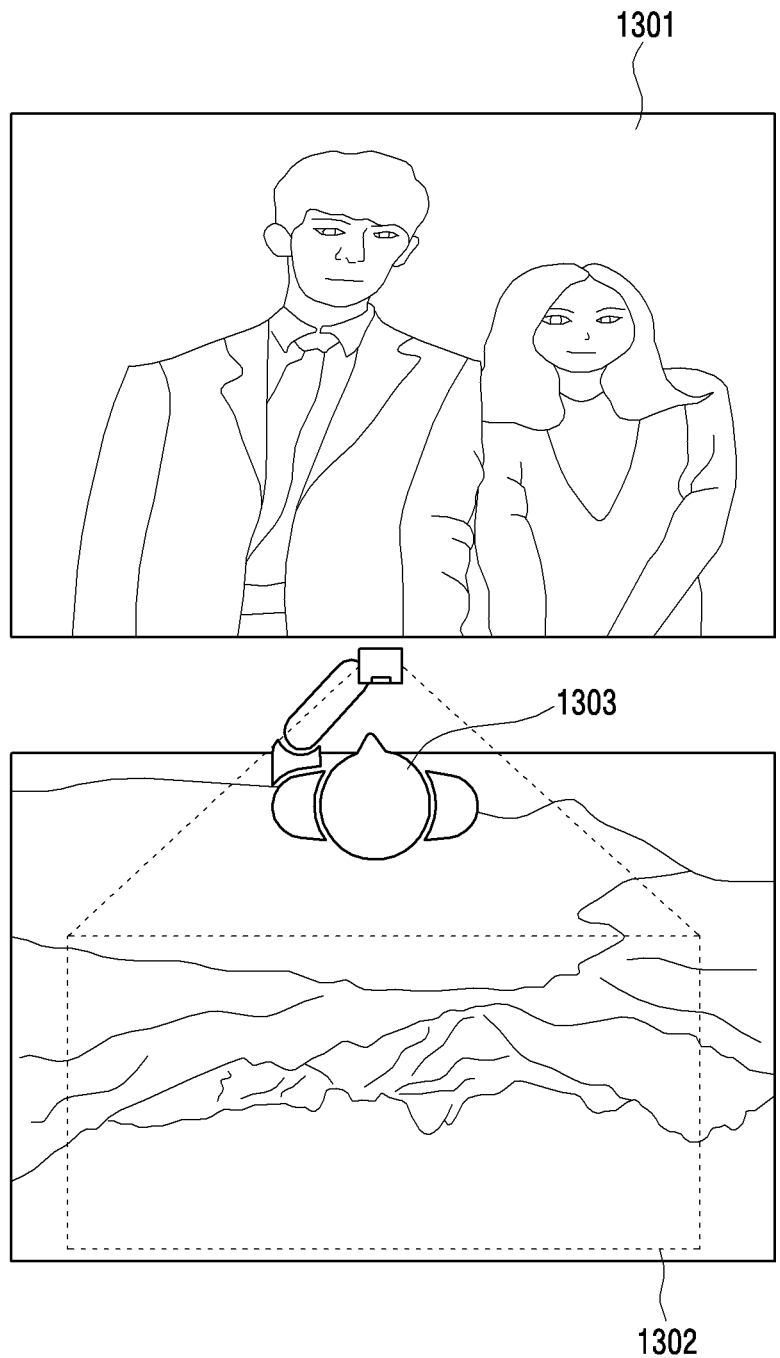
FIGS. 13A and 13B are an exemplary diagram for describing a method of acquiring a second image according to an embodiment of the present disclosure.
Figure 13B:
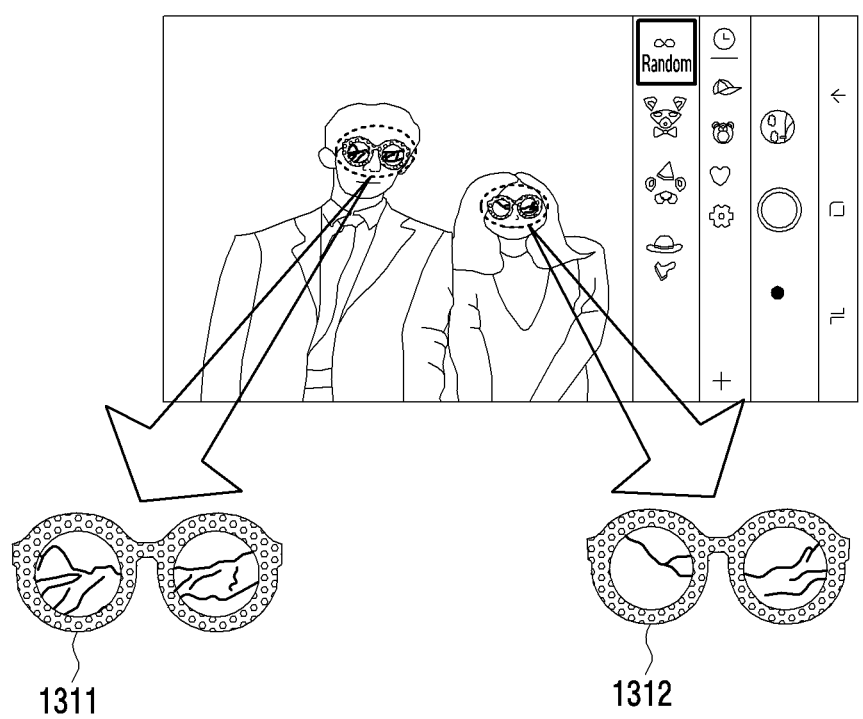

FIG. 12 is a flowchart illustrating a method of acquiring a second image according to an embodiment of the present disclosure, and FIG. 13A and FIG. 13B are exemplary diagrams for describing a method of acquiring a second image according to an embodiment of the present disclosure.

Referring to FIG. 12 to FIG. 13B, in operation 1201, a processor (e.g., the processor 120 of FIG. 1) of an electronic device (e.g., the electronic device 101 of FIG. 1) according to an embodiment of the present disclosure may identify whether a shooting direction of a second camera is a direction facing a photographer.

If it is identified in operation 1201 that the shooting direction of the second camera is not the direction facing the photographer, in operation 1203, the processor may acquire an image acquired via the second camera as the second image.

Otherwise, if it is identified in operation 1201 that the shooting direction of the second camera is the direction facing the photographer, in operation 1205, the processor may acquire the second image by removing the photographer from the image acquired via the second camera. For example, as shown in FIG. 13A, if a first image 1301 is acquired by capturing a subject via a rear camera (a first camera) of the electronic device, the processor may activate a front camera (the second camera) of the electronic device to acquire the second image to be applied to a reflective surface of an AR object. In this case, since a photographer 1303 is located between a background 1302 and the front camera of the electronic device, the front camera may capture the photographer 1303 and the background 1302 together. In this case, the processor may remove the photographer 1303 to acquire only the background 1302 as the second image. As shown in FIG. 13B, the processor may apply at least part of an image (e.g., the background image 1302), from which the photographer 1303 is removed, to reflective surfaces of AR objects 1311 and 1312.

A method of providing an augmented reality object of an electronic device (e.g., the electronic device 101) according to various embodiments of the present disclosure may include: displaying a first image captured via a first camera on a display (e.g., the display device 160); receiving a user input for adding at least one augmented reality object having at least one reflective surface on the first image; acquiring a second image via a second camera in response to the user input; identifying an angle of the reflective surface; and performing perspective transformation on the second image on the basis of the identified angle, and apply at least part of the perspective-transformed second image to each reflective surface of the augmented reality object.

According to various embodiments, the applying of at least part of the perspective-transformed second image to the reflective surface may include correcting the perspective-transformed second image in response to at least one of a size, shape, inclination, curvature, and direction of the reflective surface, and cropping a part of an area.

According to various embodiments, the applying of at least part of the perspective-transformed second image to the reflective surface may include adjusting a transparency of the perspective-transformed second image according to a material of the reflective surface.

According to various embodiments, the method may further include removing a photographer from the second image if the second image includes the photographer.

According to various embodiments, the method may further include: disposing the augmented reality object to a designated area of a subject included in the first image, identifying a distance between a subject to which the augmented reality object is displayed and the first camera, and adjusting a size of the perspective-transformed second image according to the distance.

According to various embodiments, the adjusting of the size of the perspective-transformed second image may include: increasing the size of the perspective-transformed second image if the distance to the subject is less than or equal to a designed first reference value; maintaining the size of the perspective-transformed second image if the distance to the subject exceeds the first reference value and less than or equal to a designated second reference value; and decreasing the size of the perspective-transformed second image if the distance to the subject exceeds the second reference value.

According to various embodiments, the second camera may further include a telephoto camera. The acquiring of the second image via the second image may include acquiring a telephoto image by using the telephoto camera.

According to various embodiments, the method may further include: performing the perspective transformation by using the telephoto image if a distance to a subject is less than or equal to the third reference value; and performing the perspective transformation by using the standard image if the distance to the subject exceeds the third reference value.

According to various embodiments, the acquiring of the telephoto image by using the telephoto camera may include: identifying whether there is at least one subject located at a distance less than or equal to the third reference value; and activating the telephoto camera if there is at least one subject located at the distance less than or equal to the third reference value.

According to various embodiments, the method may further include: moving the augmented reality object according to a movement of a subject; and performing perspective transformation on the second image on a real-time basis in response to the movement of the augmented reality object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136, or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a touchscreen;
a first camera capturing a first image;
a second camera capturing a second image, wherein the second camera is a dual camera comprising a standard camera and a telephoto camera;
a processor operatively coupled with the touchscreen, the first camera, and the second camera; and
a memory operatively coupled with the processor,
wherein the memory stores instructions, when executed, causing the processor to:
display the first image captured via the first camera on the touchscreen;
receive a user input for adding at least one augmented reality object having at least one reflective surface on the first image;
acquire the second image via the second camera in response to the user input;
identify an angle of the reflective surface;
perform perspective transformation on the second image on the basis of the identified angle; and
apply at least part of the perspective-transformed second image to each reflective surface of the augmented reality object,
wherein the instruction for acquiring the second image comprises instructions for acquiring a standard image via the standard camera, and acquiring a telephoto image via the telephoto camera, and
wherein the instruction for performing the perspective transformation on the second image comprises instructions for:
performing the perspective transformation by using the telephoto image if a distance between a subject to which the augmented reality object is applied and the first camera is less than or equal to a designated first reference value; and
performing the perspective transformation by using the standard image if the distance to the subject exceeds the first reference value.

2. The electronic device of claim 1, wherein the instruction for applying at least part of the perspective-transformed second image to the reflective surface comprises:
an instruction for correcting the perspective-transformed second image in response to at least one of a size, shape, inclination, curvature, and direction of the reflective surface, and for cropping a part of an area.

3. The electronic device of claim 1, wherein the memory further stores an instruction for removing a photographer from the second image if the second image comprises the photographer.

4. The electronic device of claim 1, wherein the memory further stores instructions for:
disposing the augmented reality object to a designated area of the subject comprised in the first image,
identifying the distance between the subject to which the augmented reality object is displayed and the first camera, and
adjusting a size of the perspective-transformed second image according to the distance.

5. The electronic device of claim 4, wherein the instruction for adjusting the size of the perspective-transformed second image comprises instructions for:
increasing the size of the perspective-transformed second image if the distance to the subject is less than or equal to a designated second reference value;
maintaining the size of the perspective-transformed second image if the distance to the subject exceeds the second reference value and less than or equal to a designated third reference value; and
decreasing the size of the perspective-transformed second image if the distance to the subject exceeds the third reference value.

6. The electronic device of claim 1, wherein the memory further stores instructions for:
moving the augmented reality object according to a movement of the subject; and
performing perspective transformation on the second image on a real-time basis in response to the movement of the augmented reality object.

7. The electronic device of claim 1, wherein the instruction for applying at least part of the perspective-transformed second image to the reflective surface comprises:
an instruction for adjusting a transparency of the perspective-transformed second image according to a material of the reflective surface.

8. The electronic device of claim 1, wherein the instruction for acquiring the telephoto image via the telephoto camera comprises instructions for:
identifying whether there is at least one subject located at a distance less than or equal to the first reference value; and
if there is at least one subject located at the distance less than or equal to the first reference value, activating the telephoto camera.

9. A method of providing an augmented reality object of an electronic device, the method comprising:
displaying a first image captured via a first camera on a display;
receiving a user input for adding at least one augmented reality object having at least one reflective surface on the first image;
acquiring a second image via a second camera in response to the user input;
identifying an angle of the reflective surface; and
performing perspective transformation on the second image on the basis of the identified angle; and
applying at least part of the perspective-transformed second image to each reflective surface of the augmented reality object,
wherein the second camera is a dual camera comprising a standard camera and a telephoto camera,
wherein the acquiring of the second image comprises acquiring a standard image via the standard camera, and acquiring a telephoto image via the telephoto camera, and
wherein the performing of the perspective transformation comprises:
performing the perspective transformation by using the telephoto image if a distance between a subject to which the augmented reality object is applied and the first camera is less than or equal to a designated first reference value; and
performing the perspective transformation by using the standard image if the distance to the subject exceeds the first reference value.

10. The method of claim 9, wherein the applying of at least part of the perspective-transformed second image to the reflective surface comprises:

correcting the perspective-transformed second image in response to at least one of a size, shape, inclination, curvature, and direction of the reflective surface, and cropping a part of an area.

11. The method of claim 9, further comprising removing a photographer from the second image if the second image comprises the photographer.

12. The method of claim 9, further comprising:
disposing the augmented reality object to a designated area of the subject comprised in the first image,
identifying the distance between the subject to which the augmented reality object is displayed and the first camera, and
adjusting a size of the perspective-transformed second image according to the distance.

13. The method of claim 12, wherein the adjusting a size of the perspective-transformed second image comprises:
increasing the size of the perspective-transformed second image if the distance to the subject is less than or equal to a designated second reference value;
maintaining the size of the perspective-transformed second image if the distance to the subject exceeds the second reference value and less than or equal to a designated third reference value; and
decreasing the size of the perspective-transformed second image if the distance to the subject exceeds the third reference value.

14. The method of claim 9, further comprising:
moving the augmented reality object according to a movement of the subject; and
performing perspective transformation on the second image on a real-time basis in response to the movement of the augmented reality object.

15. The method of claim 9, wherein the applying of at least part of the perspective-transformed second image to the reflective surface comprises:
adjusting a transparency of the perspective-transformed second image according to a material of the reflective surface.

16. The method of claim 9, wherein the acquiring the telephoto image via the telephoto camera comprises:
identifying whether there is at least one subject located at a distance less than or equal to the designated first reference value; and
if there is at least one subject located at the distance less than or equal to the first reference value, activating the telephoto camera.

\* \* \* \* \*